Patented Apr. 21, 1942

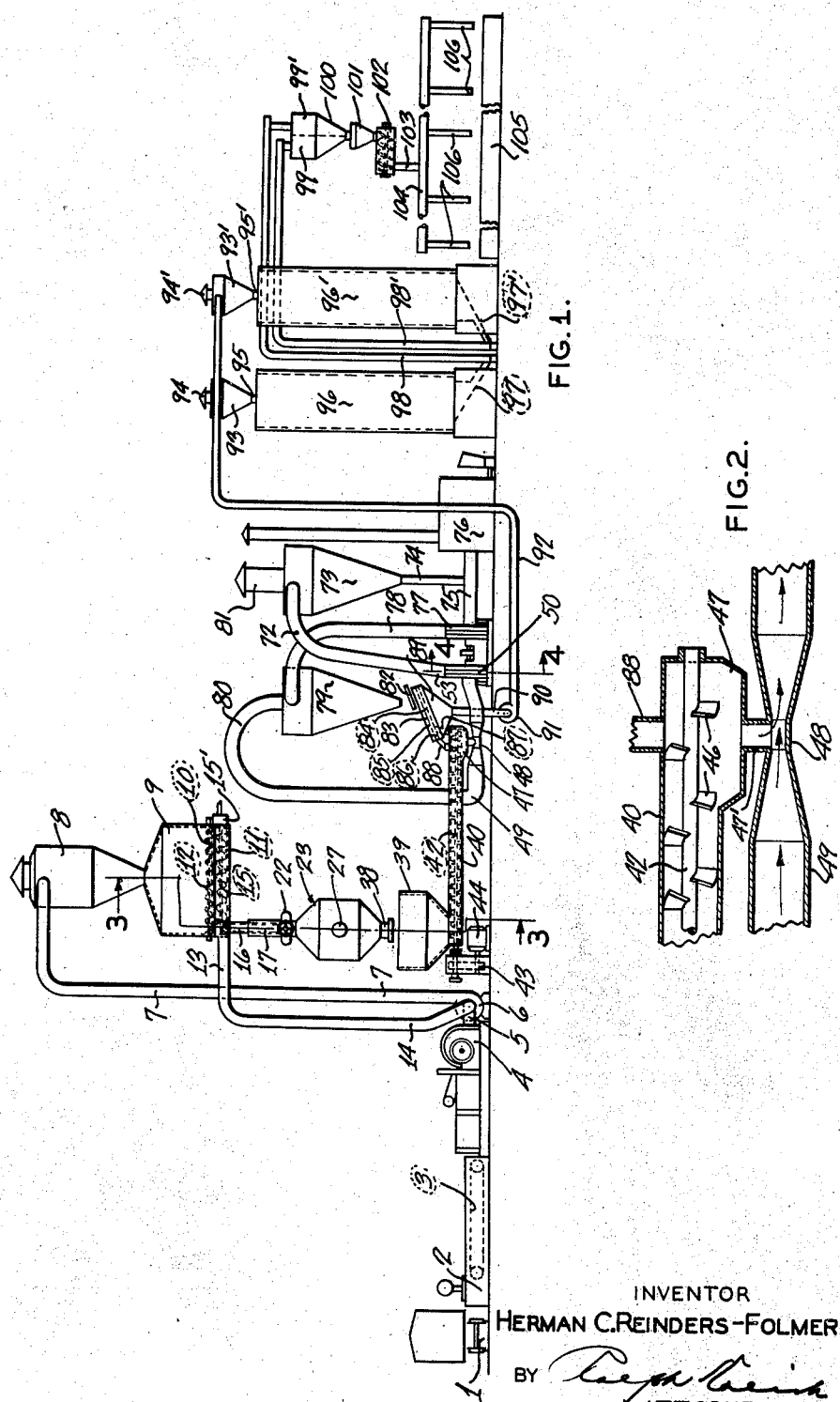

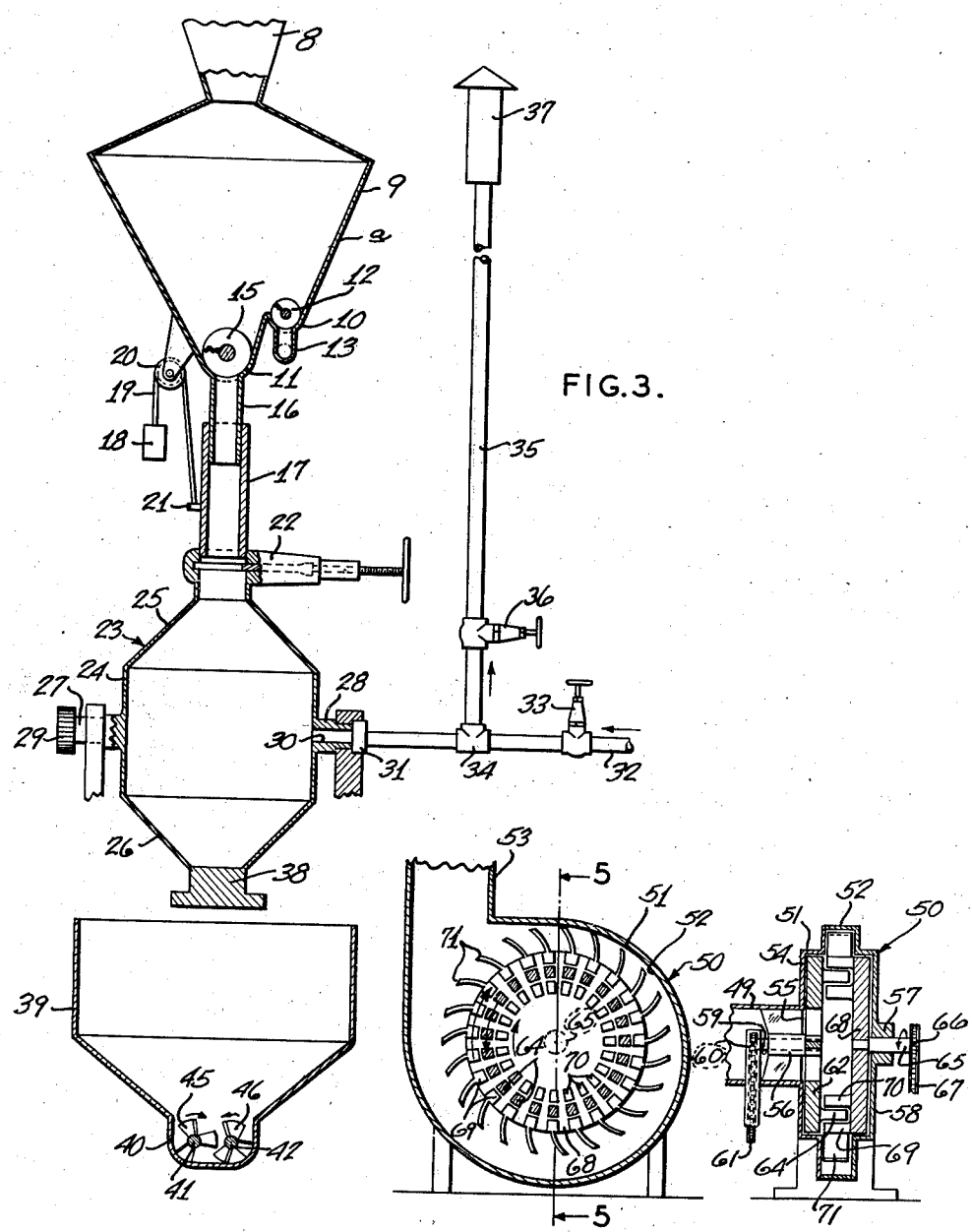

2,280,129

UNITED STATES PATENT OFFICE 2,280,129

PROCESS FOR MANUFACTURING FERTILIZER

Herman C. Reinders-Folmer, Norfolk, Va., assignor to Smith-Rowland Company, Inc., Norfolk, Va., a corporation of Virginia Application June 26, 1939, Serial No. 281,091

3 Claims. (Cl. 71—18)

This invention relates to a certain new and useful process and means for the manufacture of fertilizer from waste products and materials and, more particularly, organic waste products and materials of proteinaceous character, such as leather scrap, hides, hoofs, hair, and other animal parts, and the like.

At the present time, so far as I am aware, waste products and materials of the type stated are usually indiscriminately collected by various scavenging agencies and refuse collectors from shoe factories, tanneries, stockyards, and other sources of supply. The collected products and materials are generally piled at the fertilizer plant and in due course charged into digestors. When a particular digestor has been fully charged, the charging door or opening is sealed and high-pressure steam is admitted through an inlet in the bottom of the digestor, so that the heated steam will penetrate through the mass to a greater or lesser extent for a predetermined period of time, thus partially hydrolyzing the products and materials under treatment. At the end of the steam-treating period, a suitable outlet, preferably in the bottom of the digestor, is opened and the treated mass is allowed to discharge into a conveyor for transportation and delivery into a direct fired rotary kiln and there dried. The dried and treated material issuing from the kiln is then preferably pulverized and discharged upon the plant floor as finisher fertilizer.

It will, of course, be evident that accurate control of the available nitrogen content of the product resulting from such treatment will be extremely variable for a number of reasons. In the first place, the nitrogen content of the different waste materials going into the process varies through rather wide limits. Since the differential between the cost of the raw waste material and the selling price of the finished fertilizer is relatively small, the expense of sorting, segregating, and separately handling the various types of waste materials introduces such excessive additional costs that the procedure is economically unfeasible. Further, the waste materials, during storage, undergo an indefinite indeterminable amount of decomposition, with the result that an accurate control analysis of a particular batch prior to charging into the digestors is exceedingly difficult to obtain.

In addition, present methods of digestion, so far as I am aware, are so crude that it is practically impossible to control the rate of hydrolysis or conversion for the purpose of securing a uniformly digested product. In this connection, I have found that precise and uniform hydrolysis control during the course of digestion is relatively critical. If the leather scrap or other waste material is not sufficiently digested, the complex nitrogenous protein materials will not be sufficiently reduced to render the nitrogen available for agricultural purposes. On the other hand, if the material is excessively hydrolyzed, it will be broken down into relatively simple water soluble amino compounds, in which the nitrogen is referred to as "water soluble" nitrogen and is likewise undesirable for agricultural purposes. It is, therefore, economically essential that a maximum percentage of the proteinaceous nitrogen-containing compounds in the waste materials be broken down to an intermediate water insoluble available form.

After digestion, it is essential that the material be ground or pulverized to a relatively fine uniform size. For this purpose, it is essential that the material be thoroughly dried for convenient grinding. The wet digested material, however, is very resistant to present drying processes and is accordingly fed into a direct fired high-temperature kiln. Since the material is carbonaceous in character, it will be evident that direct exposure to heat and flame will carbonize and destroy a comparatively large quantity of the product, thereby materially reducing the salable yield, as well as darkening the product and impairing its quality.

To insure some measure of uniformity in the available nitrogen percentage of the product, it is present practice to stock the product on a large open floor in various piles and manually by shoveling operations or otherwise intermix the various piles. It will, of course, be clear that, by such incompletely controlled processes, it is impossible to produce continuously batches of fertilizer having precise predetermined or definite nitrogen content. For such reason, the custom or practice has grown up and developed in the industry to prepare a fertilizer which reasonably approximates the desired nitrogen content required by a particular consumer and then, by proper chemical sampling methods and analysis of the particular batch being shipped, base the charge to such consumer for the particular batch upon the actual nitrogen content. Consequently, a consumer who desires a fertilizer having 11% nitrogen content may receive a shipment containing possibly 10½% nitrogen. Such inaccuracies compel a change in the mixing schedule of the consumer, in the event that he is compounding a prepared fertilizer containing added ingredients in addition to the proteinaceous derivatives here under discussion.

My invention, hence, has for its primary objects the provision of a process and means for the manufacture of fertilizer from leather scrap, hide scrap, and other similar waste products and materials, which is capable of substantially precise and accurate control, which is economical and results in a very high yield of available nitrogen, which results in a uniform well-colored product, which achieves material savings in the costs of labor, processing, handling, and storage, and which is highly efficient and satisfactory in the accomplishment of its stated or intended functions.

And with the above and other objects in view, my invention resides in the unique step of the process and in the novel features of form, construction, arrangement, and combination of parts presently described and pointed out in the claims.

In the accompanying drawings (2 Sheets)—

Figure 1 is a diagrammatic elevational view illustrating a fertilizer processing apparatus or plant of my present invention for practicing my new process of fertilizer production;

Figure 2 is an enlarged fragmentary vertical sectional view of such apparatus, showing particularly the intake passage by which the digested material is continuously injected into the drying and grinding chambers;

Figures 3 and 4 are enlarged detail vertical sectional views of the apparatus, taken approximately along the lines 3—3 and 4—4, respectively, Figure 1; and Figure 5 is an enlarged detail transverse sectional view of the apparatus, taken approximately along the line 5—5, Figure 4.

Referring now in more detail and by reference characters to the drawings, which illustrate a preferred apparatus of my invention for practicing the present process, 1 designates an unloading spur-track suitably located outside the plant building adjacent an unloading platform or dock 2, which is provided with a continuously running conveyor or drag 3 discharging preferably, though not necessarily, into a rotary shredder 4 of any conventional type.

Suitably connected at the discharge end of the shredder 4, is a conveyor 5 preferably of the pneumatic type incorporating a high-speed blower 6 for lifting the shredded leather scrap or other waste material being treated through a duct 7 to a separating cyclone 8 discharging at its lower end into a relatively large storage hopper 9 having downwardly converging side walls, as at a, Figure 3. Extending transversely across the bottom of the hopper 9, is a pair of spaced parallel semi-cylindrical screw conveyor troughs 10, 11, the former being of relatively small diametrical size for accommodating a correspondingly sized continuously running screw 12 discharging into a downwardly extending duct 13 opening into an auxiliary suction line 14 of the blower 6. Operatively disposed in the other conveyor trough 11, is a relatively large low-speed screw 15 connected through a control box 15' to any suitable source of power (not shown) in such manner as to be set in motion or stopped at the will of the operator, the screw 15 discharging into a downwardly extending duct or pipe 16 provided with a telescopic or slidable tubular coupling 17 suitably counter-balanced for facile manipulation by means of a counter-weight 18 attached to one end of a cable 19 reeved or trained over a pulley 20 and connected at its opposite end to a suitable projection 21 extending radially outwardly from the coupling 17.

At its lower end, the coupling 17 removably fits into the upper end of a gate valve 22 of any conventional type, which forms a part of a relatively large rotary digester 23 constructed preferably of sheet metal of any suitable weight and thickness and comprising preferably an integrally cylindrical mid-section 24 and frusto-conical end-sections 25, 26. Along its horizontal or transverse axis, the digester 23 is formed with outwardly presented trunnions 27, 28, the former being provided with a pinion 29 for suitable driving engagement with any conventional prime mover (not shown). The trunnion 28, however, is of the so-called hollow type and its axial bore 30 is connected by suitable pipe fittings 31 to a high-pressure steam line 32, through which the admission of steam to the interior of the digester 23 is suitably controlled by a main valve 33. Intermediate the channeled trunnion 28 and the main valve 33, the steam pipe 32 is preferably provided with a T-coupling 34 for accommodating an upwardly presented pipe-section 35 equipped at a convenient location intermediate its length with an auxiliary or relief valve 36 and terminating at its upper extremity in a relatively short stack 37 suitably located on the roof of the plant in the provision of a steam relief or steam discharge line, all as best seen in Figure 3 and for purposes presently fully appearing.

The digester 23 is provided at the downwardly presented apex of its frusto-conical end-section 26 with a preferably integrally formed dummy valve or plug 38 for counter-balancing the weight of the gate valve 22, and mounted directly beneath the digester 23 is a relatively large high-sided hopper 39 discharging downwardly into an open-topped trough or channel 40, extending longitudinally in which is a pair of parallel rotary shafts 41, 42, connected through a conventional variable speed gear reduction 43 to an electric motor or other suitable prime mover 44.

The shafts 41, 42, are each provided intermediate its ends with a plurality of helically spaced paddle blades 45, 46, respectively co-operable for simultaneously crutching and conveying the digested material forwardly to a sump 47 suitably connected at its lowest point to a duct 47' forming the side arm of a Venturi inductor 48 located in the intake line 49 of a beater type fan or blower 50.

The fan or blower 50, as best seen in Figure 4, comprises a cylindrical shell 51 having a radially disposed central channel 52 opening to a discharge duct 53 and provided centrally in its one end wall 54 with an inlet opening 55 for communication with the intake duct 49.

Rigidly mounted in the shell 51 and extending across the inlet 55, is a suitable shaft journal 56 axially aligned with a corresponding shaft journal 57 formed in the opposite shell end-wall 58.

Rotatably mounted in the journal 56 and extending inwardly to a point preferably midway of the shell 51, is a shaft 59 provided at its outer end with a suitable sprocket 60 for operative connection by means of a suitable drive chain 61 with any suitable prime mover (not shown), and keyed or otherwise fixed upon the inner end of the shaft 59, is a flat centrally apertured annular or disk-like member 62 preferably integrally formed with an annular series of uniformly spaced laterally inwardly presented hammers 64.

Rotatably mounted in and extending through the opposite journal 57, is a second shaft 65 axially aligned with the shaft 59 and provided at its outwardly presented end with a suitable sprocket 66 for operative connection by means of a sprocket chain or the like 67 with any suitable prime mover (not shown). Keyed or otherwise fixed on the inner end of the shaft 65, is a companion annular or disk-like member 68 of substantially the same diametral size as the member 62 and provided on its inwardly presented face with so-called outer and inner annular series of uniformly spaced laterally presented hammers 69 and 70, the series of hammers 69 and 70 being concentrically spaced and diametrically disposed on opposite sides of, or embracingly, as it might be said, relatively to, the annular series of hammers 64. Formed preferably integrally with, and extending radially outwardly from each of, the hammers 69, is a preferably somewhat arcuate propulsion blade 71 sized for operative movement in the shell channel 52. In use and practice, the shafts 59 and 65 are rotated in relatively opposite directions, all as best seen in Figures 4 and 5 and for purposes presently fully appearing.

The discharge duct 53 of the beater fan 50 communicates through the upwardly extending duct 72 with the upper portion of a primary cyclone 73 connected at its lower end by a vertically disposed duct 74 with a horizontally extending air-duct 75 leading at one end to a hot air furnace 76 and at its other end to the intake side of a cage mill blower 77 substantially identical in construction with the beater fan or blower 50, except that the hammer arms thereof are greater in number and more closely spaced to effect pulverization of the material passing therethrough.

At its outlet side, the blower 77 communicates through a vertically extending duct 78 with the upper portion of a secondary cyclone 79, in turn, at its upper end connected through a duct 80 with the intake duct 49 of the beater fan 50 rearwardly of the inductor 48, all as best seen in Figure 1 and for purposes presently fully appearing.

It will thus be evident that the blower 77 will draw a current of hot air through the furnace duct 75 and force the same upwardly through the duct 78 into the cyclone 79, from which the hot air will be drawn out through the duct 80 into the suction line 49 by means of the beater fan 50, which thereupon forces the hot air through the duct 72 into the primary cyclone 73. It will, of course, be further evident that the velocity of the air through the Venturi-type inductor 48 will be such as to create a suction in the sump duct 47', thereby sucking in the digested material from the sump 47 without producing appreciable pressure drop in the system. Mounted in the top of the cyclone 73, is a vent or stack 81 for allowing the moist air to exhaust to atmosphere, thus preventing the apparatus from becoming excessively humid and impairing the drying efficiency thereof.

At its lower end, the secondary cyclone 79 discharges downwardly upon an obliquely disposed magnetic plate 82 positioned over the upper end of a shell 83 interiorly provided with a double-deck oblique vibrating screen 84 comprising upper and lower mesh sections 85, 86, the former of which is of relatively coarse mesh and discharges through a discharge opening 87 to a dump truck or other refuse container (not shown). The other screen-section 86 is of relatively fine mesh and discharges through a discharge spout 88 into the sump 47.

The shell 83 is further provided with a somewhat conical hopper-shaped bottom 89 discharging into a vertically disposed duct 90 connected with the intake side of a blower fan 91, in turn, connected at its outlet side to a relatively long pneumatic conveyor duct 92 having substantially great exterior surface for cooling the material being treated as the same is transported therethrough.

At its outlet end, the duct 92 discharges into a pair of parallel separator cyclones 93, 93', provided in their respective top walls with exhaust vents 94, 94', and discharging at their respective lower extremities through vertically disposed ducts 95, 95', into the top of relatively large storage silos 96, 96', which latter, at their respective lower extremities, discharge through chutes 97, 97', into transfer conveyors 98, 98', preferably, though not necessarily, of the drag link type, in turn, discharging respectively into compartments 99, 99', of a bin or hopper 100 emptying through a weighing hopper 101 with a conventional paddle or screw type mixer 102. At its discharge end, the mixer 102 is connected through a vertically disposed duct 103 to a horizontally disposed screw conveyor 104 suitably mounted over a loading dock 105 and having a plurality of take-off spouts 106 for convenience in spotting and loading cars or other vehicles for transportation of the treated material from plant to merchant or consumer.

The leather scrap and other waste material to be treated, as the same is unloaded and transported through the conveyor 3 into the shredder 4, is preferably, though not necessarily, comminuted or shredded to a substantially finely divided fibrous state and is pneumatically conveyed to the separator cyclone 8, where the mass is separated from the carrier air and deposited into the hopper 9.

By means of the continuously running screw conveyor 10, a predetermined portion of the raw material is continuously discharged into the auxiliary suction line 14 and recirculated with the incoming raw material from the shredder 4. Depending upon the peculiar conditions of the raw material supply, the percentage of recirculated material may be varied, so that the raw material in the hopper 9 is constantly being intermingled and mixed for achieving a substantial uniformity thereof.

For charging, the digester 23 is rotated upon its trunnions until the opening of the gate valve 22 is positioned directly beneath the coupling-pipe 17, which is thereupon dropped downwardly and the valve 22 then opened and the screw 15 set in motion, whereupon the raw material will be discharged downwardly into the digester 23, filling the latter to any predetermined point. The valve 22 is thereupon closed, the coupling 17 shifted upwardly, and the main steam valve 33 opened to admit a predetermined quantity of steam to the digester 23. Meanwhile, the digester drive mechanism is set in motion and the digester 23 rotated about a horizontal axis at any predetermined speed.

By reason of the fact that the material being treated is mechanically fed into the digester 23 at a continuous rate during the charging cycle, the charge will not become densely packed, but will assume a more or less porous loosely matted form, through which the entering steam will readily and quickly circulate. Furthermore, by reason of the fact that the digester 23 is being rotated, the material will be more or less in a state of constant agitation, so that all of the particles of material being treated will be rapidly and uniformly exposed to the action of the steam. Hence the entire charge will be thoroughly and uniformly hydrolyzed in a very short period of time with a minimum application of steam. In addition, the length of time during which the steam is applied, together with the speed of rotation of the digester 23, may be very precisely determined for accurately achieving the desired amount of hydrolysis required to produce a maximum yield of digested material containing the maximum percentage of available water insoluble nitrogen.

When the digestion cycle is completed, the digester 23 is stopped with the valve 22 presented downwardly over the hopper 39. The main steam valve 33 is closed, and the auxiliary or relief valve 36 opened to reduce the excessive pressure in the digester 23. When the pressure in the digester 23 has been sufficiently reduced, the valve 22 is opened, allowing the digested material to be discharged or blown downwardly into the hopper 39. By running the paddle conveyor 40 at the proper speed, the batch of digested material will be transported out of the hopper 39 by the time the next successive batch of digested material is ready to be discharged thereinto, thus providing a continuous flow of digested material through the paddle conveyor 40 to the sump 47.

From the sump 47, the digested material is drawn by the Venturi-type inductor 48 into the intake duct 49 and is conveyed by the high-speed current of hot air into the beater fan 50, wherein any agglomerated particles of the digested material will be broken up and dispersed, being thence pneumatically conveyed in the hot air current to the primary cyclone 73 and there separated from the carrier air. Falling by gravity from the lower portion of the primary cyclone 73 through the duct 74, the material being treated will drop into the current of hot air being drawn out of the hot air furnace 76 through the duct 75 and will thus be conveyed to the cage mill blower 77 and there finally pulverized or comminuted and then conveyed with the current of hot air through the duct 78 to the secondary cyclone 79. In the latter, the material being treated will be separated from the carrier air, dropping by gravity through the bottom portion of the cyclone 79 and discharging upon the magnetic plate 82, which functions to abstract and remove from the material being treated any iron, wire, nails, or other ferrous articles. From the magnetic plate 82, the material being treated will drop upon the coarse screen-section 85, which will separate out the coarse and undigested and foreign particles. The remaining portion of the material being treated passes through the coarse vibrator screen section 85 and drops upon the fine mesh vibrator screen section 86, which latter separates out any relatively large, incompletely ground particles and returns the same to the sump 47 for recirculation with the undried and uncomminuted digested material. The fine properly comminuted and properly dried material passes through the screen section 86 and moves by gravity downwardly through the hopper bottom 89 of the shell 83 into the suction line 90 of the blower 91 and thence is conveyed through the pneumatic conveyor duct 92 to the separator cyclones 93, 93'.

If the particular type of raw waste materials available in the locality of the plant is of relatively constant character, the silos 96, 96', may be alternately filled as convenience and necessity require. If, on the other hand, the raw material is of sufficiently widely varying character that it may be roughly divided into high grade and low grade waste, it may be more convenient and economical to operate the plant for a certain period on high grade material and store the treated material or fertilizer resulting therefrom in one of the storage silos, such as, for instance, the silo 96, and then operate the apparatus for another period on low grade material, storing the treated material or fertilizer resulting therefrom in the other storage silo 96'. Since, in either case, the resulting fertilizer will be of relatively uniform character, I am enabled to readily determine with considerable accuracy the respective nitrogen analyses in the high grade and low grade fertilizers and supply the consumer with a uniform fertilizer of any selected nitrogen analysis within maximum and minimum limits by withdrawing calculated quantities of high grade and low grade fertilizer from the compartments 99, 99', respectively, of the hopper 100 into the bin or weighing hopper 101 and uniformly mixing the two through the mixer 102 as the product is conveyed to the conveyor 104 for ultimate shipment.

It should also be noted in this connection that the wet digested material is first discharged into a current of hot carrier air, which is drawn from the secondary drying cyclone 79 and is consequently of relatively low temperature. The material being treated is thus initially dried at low temperature, so that any tendency for the particles to encrust around a moisture-laden interior is substantially prevented, such slow drying step continuing as the particles are initially broken up in the beater fan 50 and carried up to the primary cyclone 73. At this point, the particles of the material being treated are substantially dry and are substantially of a uniform finely divided size. Such particles thereupon drop through the duct 74 into the hot air current as it is being drawn directly from the furnace 76 and is at its highest temperature. At such high temperature, the particles are completely dried as they pass through the cage mill blower 77 for final comminution and thence through the duct 78 to the secondary cyclone 79.

This two-stage simultaneous drying and grinding operation results in the production of an extremely well dried and uniformly pulverized or comminuted fertilizer product which is entirely satisfactory in color. It will furthermore be evident that none of the valuable fertilizer material will be lost as a result of carbonization or other causes.

It should be understood that changes and modifications in the several steps of fertilizer production and in the form, construction, arrangement, and combination of parts of the means for manufacturing fertilizer may be made and substituted for those herein shown and described without departing from the nature and principle of my invention.

Having thus described my invention, what I claim and desire to secure by Letters Patent is:

1. The process of manufacturing fertilizer from proteinaceous waste material comprising, shredding the proteinaceous material, confining a predetermined quantity of said material in a pressure vessel having a volume substantially larger than that of said quantity of material, hydrolyzing the shredded material by admitting high-pressure steam into the vessel and at the same time vigorously agitating the shredded proteinaceous material for providing substantially uniform penetration of steam throughout the entire mass of shredded material to such a degree and for such a period of time only as to yield a maximum insoluble nitrogen content, then promptly injecting the hydrolyzed material into a rapidly moving current of hot air for arresting the hydrolytic reaction to prevent production of any substantial amount of water-soluble nitrogenous compounds, and maintaining the material in suspension in said air stream for a time sufficient to reduce the material to substantial dryness.

2. The process of manufacturing fertilizer from proteinaceous waste material comprising, reducing the waste material to finely subdivided form, confining the subdivided waste material in a pressure vessel, hydrolyzing the waste material by tumbling said material in the vessel while admitting high-pressure steam into the vessel for a period of time sufficient to yield a maximum available insoluble nitrogen content then promptly arresting hydrolysis by injecting the hydrolyzed material into a rapidly moving current of hot air for simultaneously transporting the material and drying the same, sufficiently to permit grinding, grinding the dried material while supported in the current of air, and then conveying the ground material in a current of hot air of relatively increased temperature with respect to the first current of hot air for finally drying the same.

3. The process of manufacturing fertilizer from proteinaceous waste material comprising hydrolyzing the waste material in the presence of steam for only a period of time sufficient to yield the maximum available insoluble nitrogen content then promptly arresting hydrolysis by injecting the hydrolyzed material into a rapidly moving current of hot air for simultaneously transporting the material and while supported in the current of air drying the same sufficiently to permit grinding, grinding the thusly dried material and then conveying the ground material in a current of hot air of relatively increased temperature with respect to the first current of hot air for finally drying the same.

HERMAN C. REINDERS-FOLMER.